Patented May 3, 1932

1,856,231

UNITED STATES PATENT OFFICE

HAROLD T. STOWELL, OF BUFFALO, NEW YORK, ASSIGNOR TO NATIONAL ANILINE & CHEMICAL COMPANY, INC., OF NEW YORK, N. Y., A CORPORATION OF NEW YORK

PRODUCTION OF NITROANTHRAQUINONE

No Drawing. Application filed June 4, 1927. Serial No. 196,632.

This invention relates to an improved process for the production of a nitroanthraquinone, more particularly dinitroanthraquinone.

The production of anthraquinone by the condensation of o-benzoyl-benzoic acid (prepared by the condensation of phthalic anhydride with benzene in the presence of aluminum chloride) in sulfuric acid or in oleum, the isolation from the reaction-mixture of the anthraquinone thus produced, and the subsequent nitration of the isolated anthraquinone for the production of a nitroanthraquinone are well known.

According to the present invention, the reaction-mixture resulting from the condensation of o-benzoyl-benzoic acid to anthraquinone in the presence of sulfuric acid or oleum, without the isolation of the anthraquinone therefrom, is treated directly with a nitrating agent for the production of a nitroanthraquinone.

By omitting the isolation of the synthetic anthraquinone from the reaction-mixture, and subjecting it to nitration in the presence of the same sulfuric acid solution in which it is formed, the yields of nitroanthraquinone are increased and the quality undiminished, and in consequence a considerable saving in the cost of its production is effected.

The invention will be further illustrated by the following specific example, but it will be understood that the invention is not limited thereto. The parts are by weight.

*Example.*—100 parts of technical o-benzoyl-benzoic acid of about 85 percent purity is added to 250 parts of vigorously stirred 26 percent oleum, and the mixture is heated, with continued stirring, at about 125°–130° C. for about one hour or until the formation of anthraquinone is complete. 210 parts of sulfuric acid of 100 percent strength is then added to facilitate stirring during the nitration and the mixture is cooled to about 30° C. 126.5 parts of mixed sulfuric and nitric acids, containing about 46 percent of nitric acid, is then added, keeping the temperature below about 70° C. After the addition of the mixed acids, the mixture is heated at 90°–100° C. for about 3 hours or until the nitration is completed. It is then poured into about 2000 parts of ice-water, the precipitate is filtered off, washed with water until substantially free from acid, and dried. The resulting product consists mainly of 1.5 and 1.8-dinitroanthraquinone of quality suitable for use as an intermediate in the manufacture of dyestuffs, and the yield is excellent. The product also contains other isomeric nitroanthraquinones and impurities.

In carrying out the process of the present invention, it will be understood that the proportion and concentration of reagents, and the conditions employed, may vary considerably from those given in the example. For instance, in the condensation of o-benzoyl-benzoic acid to anthraquinone, sulfuric acid of about 92 to 100 percent or oleum up to about 26 percent or higher, may be employed, and temperatures varying from 100° to about 150° C. or higher may be used. As a rule, the stronger the acid or the oleum, the lower the temperature employed for condensation. Further, instead of adding a mixture of sulfuric and nitric acids, nitric acid or a nitrate capable of yielding nitric acid with sulfuric acid, such as sodium or potassium nitrate, may be employed. In general, the amount of nitrating agent employed is about 1 to 25 percent in excess of that theoretically required to produce the desired degree of nitration, it depending largly upon the character of the impurities present in the o-benzoyl-benzoic acid employed. As a rule, the greater the amount of impurities the greater the excess of nitric acid required.

In the claims, it will be understood that the term "sulfuric acid" includes both sulfuric acid and oleum unless otherwise specified.

I claim:

1. In the nitration of anthraquinone, the process which comprises reacting a nitrating agent with the reaction-mixture obtained by condensing o-benzoyl-benzoic acid to anthraquinone in the presence of sulfuric acid.

2. In the production of a nitroanthraquinone, the process which comprises condensing o-benzoyl-benzoic acid to anthraquinone in the presence of sulfuric acid and subjecting the resulting reaction-mixture to the action of a nitrating agent in excess.

3. A process of producing a dinitroanthraquinone, which comprises condensing o-benzoyl-benzoic acid to anthraquinone in the presence of sulfuric acid and subsequently subjecting the resulting reaction-mixture, without isolation of the anthraquinone contained therein, to the action of a nitrating agent under conditions producing a dinitroanthraquinone.

4. A process of producing a dinitroanthraquinone, which comprises reacting a mixture of sulfuric and nitric acids with the reaction-mixture resulting from the condensation of o-benzoyl-benzoic acid to anthraquinone with sulfuric acid.

5. In the production of a mixture comprising 1.5- and 1.8-dinitroanthraquinone, the process which comprises condensing o-benzoyl-benzoic acid to anthraquinone in the presence of sulfuric acid, and then reacting the mixture thus obtained with a nitrating agent under conditions producing a mixture of 1.5- and 1.8-dinitroanthraquinone.

6. A process of producing 1.5- and 1.8-dinitroanthraquinone in admixture, which comprises condensing o-benzoyl-benzoic acid to anthraquinone in the presence of oleum, subsequently introducing 100 percent sulfuric acid, and nitrating the mixture thus obtained by the addition thereto of a mixture of sulfuric and nitric acids containing about 46 per cent of nitric acid, the amount of said mixture of sulfuric and nitric acids being about 1 to 25 percent in excess of that required to effect dinitration.

7. In the production of 1.5- and 1.8-dinitroanthraquinone in admixtures, by the action of a nitrating agent on the reaction-mixture obtained by condensing o-benzoyl-benzoic acid to anthraquinone in the presence of sulfuric acid, the step comprising the addition of the nitrating agent to said reaction-mixture at a temperature maintained below 70° C. and subsequently heating the mixture thus obtained to a temperature of about 90°–100° C.

8. A process of producing 1.5- and 1.8-dinitroanthraquinone in admixture which comprises condensing o-benzoyl-benzoic acid to anthraquinone in the presence of sulfuric acid having a concentration between 92 per cent sulfuric acid and 26 per cent oleum, adding 100 per cent sulfuric acid to the resulting reaction mixture and reacting the mixture with a nitrating agent under conditions producing a mixture of 1.5- and 1.8-dinitroanthraquinone.

9. A process for the production of nitroanthraquinones which comprises condensing technical o-benzoyl-benzoic acid to anthraquinone with sulfuric acid and nitrating the resulting reaction mixture without isolation of the anthraquinone therefrom.

10. A process for the production of nitroanthraquinones which comprises condensing technical o-benzoyl-benzoic acid with sulfuric acid to anthraquinone and subsequently nitrating the resulting reaction mixture without isolation of the anthraquinone therefrom under conditions yielding a dinitroanthraquinone.

11. A process for the production of 1.5- and 1.8-dinitroanthraquinones in admixture, which comprises condensing technical o-benzoyl-benzoic acid in the presence of oleum to anthraquinone and subsequently without isolation of the anthraquinone, nitrating the resulting reaction mixture with a mixture of sulfuric and nitric acids containing about 40% of nitric acid.

In testimony whereof I affix my signature.

HAROLD T. STOWELL.